Oct. 18, 1927.

G. W. McKALE 1,646,302

BEARING FOR CONNECTING RODS AND FOR OTHER PARTS OF MACHINERY

Filed Jan. 23, 1926

George W. McKale,
INVENTOR

BY Victor J. Evans
ATTORNEY

WITNESS:

Patented Oct. 18, 1927.

1,646,302

UNITED STATES PATENT OFFICE.

GEORGE WILLIAM McKALE, OF ELSMORE TOWNSHIP, ALLEN COUNTY, KANSAS.

BEARING FOR CONNECTING RODS AND FOR OTHER PARTS OF MACHINERY.

Application filed January 23, 1926. Serial No. 83,301.

This invention relates to adjustable bearings, and its general object is to provide a bearing that can be easily and expeditiously tightened and adjusted without removing or displacing any of the few parts thereof, to take up wear and for other purposes, with very little effort on the part of the operator.

A further object of the invention is to provide an adjustable bearing that includes its adjusting features in the inherent resiliency of the metal forming the body and cap thereof.

Another object of the invention is to provide an adjustable bearing which is extremely simple in construction, contains only four parts, with the result that it is very inexpensive to manufacture, yet it will perform its function in an efficient manner and will be capable of enduring a long life.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which.

While I have shown my bearing on a connecting rod, it will be obvious that the bearing can be used for any other purpose where a bearing of this type is desired.

In the present instance, the connecting rod has formed thereon one member of my bearing, which has secured thereto by the usual bolt and nut connections 1, a cap 2 having the usual bores 3 aligned with similar bores formed in said member.

Figure 1:
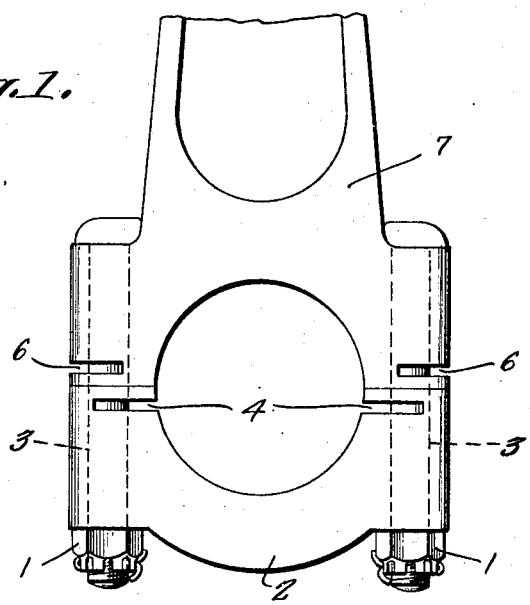
Figure 1 is a fragmentary side elevation of the bearing which forms the subject matter of the present invention.
Figure 2:
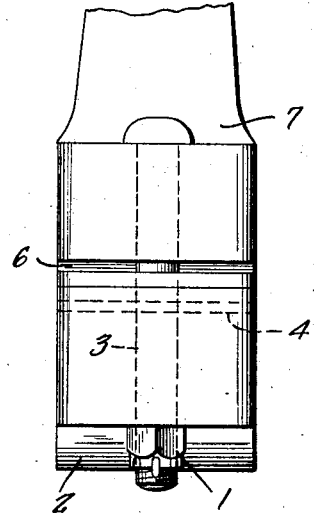
Figure 2 is an edge elevation thereof.

The cap is provided with confronting slots 4 transversely formed in the opposite sides of its inner face and these slots 4 extend into the bores 3 of said cap as clearly shown in Figure 1 of the drawing. The slots are disposed adjacent the upper ends of the cap so that they form resilient strips adapted to engage the majority of the under surface of the member formed with the connecting rod, and said member is also slotted on its outer sides as at 6 to provide strips adapted to engage the upper surface of the cap 2; these slots 6 also extend into the bores 3 as shown and the inner ends of the slots are disposed in overlapping relation so that while ample resilient qualities have been provided, it will be obvious that the structure has not been weakened. Of course, the member formed with the connecting rod which in the present instance is indicated by the reference numeral 7, is provided with a semi-circular recess cooperating with a semi-circular recess formed in the cap and these recesses are adapted to receive the usual Babbitt bushing (not shown).

From the above description and disclosure of the drawings, it will be obvious that I have provided a bearing that is adjustable by merely adjusting the nuts of the bolt and nut connections 1 and due to the resilient qualities of the parts mentioned, the same will contract and expand as the case may be and thereby adjust the bearing accordingly.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A bearing of the character described comprising a cap, provided with a semi-circular recess, and formed with slots transversing the inner face thereof, a member provided with a semi-circular recess, means for securing said cap to said member in a manner whereby the semicircular recesses cooperate, said member being provided with slots in its outer sides and said slots cooperating whereby the bearing can be adjusted by adjusting the securing means for the cap.

2. An adjustable bearing of the character described comprising a member having a semi-circular recess therein and provided with bores disposed upon opposite sides of the recess, a cap for said member and being provided with a semi-circular recess and bores adapted to be aligned with the bores first mentioned, securing means passing through said bores for detachably fixing said cap to said member in a manner whereby the semi-circular recesses cooperate, said cap being provided with slots transversing the inner face thereof and being in communication with the bores, said member being also provided with slots upon the outer opposite sides thereof and communicating with said bores, and said slots provide resilient strips arranged in confronting relation for a portion of their length whereby the bearing can be adjusted as and for the purpose specified.

GEORGE WILLIAM McKALE.